United States Patent [19]
Bartig et al.

[11] Patent Number: 5,095,741
[45] Date of Patent: Mar. 17, 1992

[54] PRESSURE TRANSDUCER FOR DETERMINING THE PRESSURE IN THE COMBUSTION CHAMBER OF AN INTERNAL COMBUSTION ENGINE

[75] Inventors: Ingo Bartig, Berlin; Rainer Burkel, Asperg; Hansjoachim Mamisch, Berlin; Winfried Moser, Ludwigsburg, all of Fed. Rep. of Germany

[73] Assignee: Robert Bosch GmbH, Stuttgart, Fed. Rep. of Germany

[21] Appl. No.: 576,409

[22] PCT Filed: Feb. 15, 1989

[86] PCT No.: PCT DE/89/00086
    § 371 Date: Sep. 7, 1990
    § 102(e) Date: Sep. 7, 1990

[87] PCT Pub. No.: WO89/09384
    PCT Pub. Date: Oct. 5, 1989

[30] Foreign Application Priority Data
    Apr. 2, 1988 [DE] Fed. Rep. of Germany ....... 3811311

[51] Int. Cl.$^5$ .................. G01L 9/08; G01L 23/10
[52] U.S. Cl. ........................... 73/115; 73/723; 73/754; 73/756; 73/DIG. 4
[58] Field of Search ............... 73/720, 717, 723, 754, 73/DIG. 4, 115, 756

[56] References Cited

U.S. PATENT DOCUMENTS

| | | | |
|---|---|---|---|
| 4,570,097 | 2/1986 | Shukla et al. | 73/754 |
| 4,993,266 | 2/1991 | Omura et al. | 73/720 |

FOREIGN PATENT DOCUMENTS 2022261 12/1979 United Kingdom.

Primary Examiner—Donald O. Woodiel
Attorney, Agent, or Firm—Michael J. Striker

[57] ABSTRACT

In a pressure transducer (11), the diaphragm (14) is fastened at the front side of the housing (10) facing the combustion chamber of an internal combustion engine by weld connections. The pressure acting on the diaphragm (14) is transmitted via the plunger (16) to a sensor block (18) including a plurality of piezoelectrically acting crystals (19, 20). The quartz disks (19, 20) are glued together with one another and with an intermediate electrode (21) as well as with the housing (10) of the pressure transducer (11) by a conducting glue. The plunger (14), the abutment (23) and the piezoelectrically acting crystals (19, 20) are connected in the housing (10) so that force transmission to the crystals (19, 20) occurs without mechanical pretensioning. The pressure transducer (11) is virtually free of dynamic temperature errors and enables a relatively exact determination of the pressure curve with respect to time in the combustion chamber of an internal combustion engine in long-term operation.

8 Claims, 3 Drawing Sheets

PRESSURE TRANSDUCER FOR DETERMINING THE PRESSURE IN THE COMBUSTION CHAMBER OF AN INTERNAL COMBUSTION ENGINE

BACKGROUND OF THE INVENTION

The invention relates to a pressure transducer for determining the pressure in the combustion chamber of an internal combustion engine and comprising a housing and a piezo-electric crystal located in the housing between a plunger and an abutment. In such a known pressure transducer, the pressure curve with respect to time in the combustion chamber of an internal combustion engine is determined via the affect of force on one or more quartz crystals utilizing their piezoelectric properties. The elements transmitting the force are pressed against the quartz crystals with high mechanical prestress. However, these pressure transducers have large dynamic temperature errors and become soiled relatively quickly. In addition, there is a higher signal noise as a result of the purely mechanical force-locking connection. The known pressure transducers are not sufficiently independent of temperature fluctuations. Dynamic temperature errors are caused by additional forces acting on the quartz crystals in the engine cycle as a result of the periodic temperature changes in the area near the surface of the combustion chamber.

A portion of the force acting on the front face of the pressure transducer face is formed by a diaphragm and the rim of the housing, is absorbed directly by the housing, the remaining portion is likewise absorbed by the housing indirectly via the plunger, quartz crystals and the counter-bearing or abutment. In so doing, the force K acting on the quartz crystals is based on the following equation:

$$K = \frac{p \cdot A_{eff}}{1 + c_M/c_{S,Q}}$$

K = force
p = pressure
$A_{eff}$ = effective surface
$c_M$ = spring constant of the diaphragm
$c_{S,Q}$ = spring constant of the plunger with quartz crystals The force K acting on the quartz crystals is accordingly substantially determined by the effective surface $A_{eff}$ of the pressure/force conversion. The diaphragm is conceived as a spring which is prestressed at the housing rim and is elastically deformed when loaded due to the contraction of the plunger. Accordingly, a part of the force component determined by p · $A_{eff}$ is again directly absorbed by the housing due to the force by-pass through the diaphragm ring. This component is a function of the ratio of the spring constants of the diaphragm $C_M$ and the plunger with the quartz crystals $c_{S,Q}$. For an unequivocal relationship between the measured force K and the pressure p, the effective surface $A_{eff}$ and the spring constants $c_M$ and $c_{S,Q}$ must be sufficiently independent from the pressure and temperature. These dependencies do not have a disturbing effect when the spring constant $c_M$ is sufficiently small.

However, the allowable maximum value for the diaphragm spring constant $c_M$ is still smaller because of the requirement for the suppression of dynamic temperature errors. For this, the spring constant $c_M$ must be as small as possible, thus the diaphragm must be as thin as possible. This requirement is not met in the known pressure transducers.

SUMMARY OF THE INVENTION

The object of the invention is pressure sensor, that insures that the determined force signal is virtually independent of fluctuations in pressure and temperature. The object of the invention is achieved by providing a continuous material connection without a mechanical prestress between the crystal and a diaphragm having a thickness of 60–100 μm with the diaphragm being welded to the housing, and all contact surfaces at the plunger end being connected by glueing at the remote from the membrane.

Because of the indicated thickness of the diaphragm, the latter has the necessary small spring constant $c_M$, which is sufficiently constant during measurement. The dynamic temperature error can accordingly be greatly reduced compared with known pressure transducers.

No additional possibilities of disturbance falsifying the measurement, particularly as a result of changes in the prestess caused by temperature, arise because welding and gluing that form the material seal, are used as types of connection, so that the high mechanical prestress is dispensed with. Further, the saving in space resulting from the gluing and welding makes possible to use a smaller diameter of the pressure transducer, which in particular allows the installation of a spark plug in the housing. The machining costs for the parts located in the flux of force, described above, is reduced. The ratio between the measurement signal and the background noise is improved.

When using a welded-in cap diaphragm, the outer diameter can be kept relatively small and the construction simplified. In addition, a relatively large effective surface $A_{eff}$, and accordingly a relatively high sensitivity of the pressure transducer, is achieved. The cap diaphragm makes it unnecessary to compensate for differences in length between the housing and inner construction by subsequent machining. The cap diaphragm is centered by the cap rim. The rim weld, which must be mechanically secure and airtight, no longer constitutes a limitation of the diaphragm.

The construction of the pressure transducer with respect to thermal resistance allows a self-cleaning temperature to be reached at the combustion chamber side, which enables long-term use. In so doing, the temperature of the quartz crystals does not rise above 150° C., so that the range of greater dependency on temperature is avoided for the piezoelectric coefficients and accordingly for the pressure sensitivity of the pressure transducer. An additional water cooling is not necessary.

With suitable plunger and quartz geometry and the lower pressure sensitivity of the pressure transducer which is connected with the latter, the lower natural frequency of the plunger, and the higher acceleration sensitivity are allowable, the heat conducting foil between the plunger and the quartz crystals can also be dispensed with for the sake of simplicity without increasing the quartz temperature. An abutment to be screwed in for the plunger can accordingly also be dispensed with.

The pressure transducer can be produced as an independent unit with its own housing and can be inserted into the housing of a spark plug already before installation of the spark plug insulator. The unit can simply be pressed against a seat with a screw which is conical in the front.

By using sensor blocks having a square cross section, space is provided for the bond wires; the measurement voltage of the quartz crystals can be tapped via the latter. The production of the small sensor blocks by sawing larger quartz and electrode disks which are already glued together with conducting glue, prevents the insulation problems which occur because of swelling-out conducting glue when the quartz disks, which only have a thickness of 0.2 mm, are glued individually at the end faces, and greatly simplifies the gluing of the disks.

The present invention both as to its construction so to its mode of operation, together with additional objects and advantages thereof, will be best understood from the following detailed description of the preferred embodiments when read with reference to the accompanying drawings.

DESCRIPTION OF THE PREFERRED EMBODIMENTS

Figure 1:
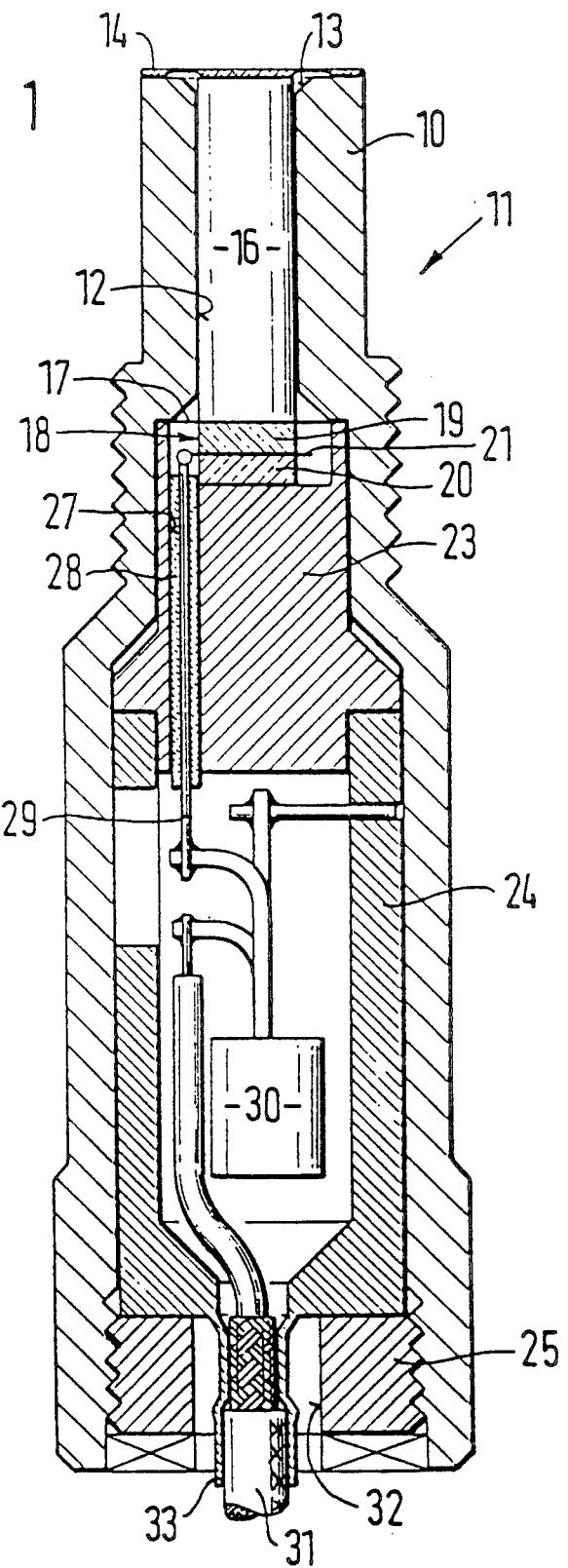
FIG. 1 shows a cross-sectional view of a pressure transducer according to the invention.

The housing of a pressure transducer 11 for determining the pressure in the combustion chamber of an internal combustion engine is designated in FIG. 1 by 10. It comprises a central, continuous, repeatedly stepped bore 12. The opening 13 facing the combustion chamber is closed by an etched diaphragm 14. The bore 12 is constructed so as to be conical in the area of the opening 13, so that the bending area of the diaphragm 14 can bend freely. The outer rim of the diaphragm 14 is welded to the front side of the housing. A plunger 16 is welded at its end to the central area of the, diaphragm 14, which has same thickness as the outer rim the plunger 16 being glued together with a heat conducting foil 17 at its other end. The plunger 16 is displaceable in the bore 12. The sensor block 18 comprises two quartz disks 19, 20, an intermediate electrode 21 being glued in between the latter as shunt electrode. The sensor block 18 is glued between the heat conducting foil 17 and the abutment 23 which presses the heat conducting foil 17 against a shoulder of the housing 10. All gluing in the region of the quartz crystals is carried out with a high temperature-resistant conducting glue, e.g. epoxy resin with silver powder. The abutment 23 is fastened in the bore 12 by a contact pressure sleeve 24 and a closing screw 25 which is screwed into the bore 12. Further, the abutment 23 comprises a continuous bore 27 having an axis extending approximately parallel to the axis of the bore 12, the shunt line 29 of the intermediate electrode 21 being guided into the bore 27 in a ceramic tube 28. The shunt line 29 leads to a transistor 30 or directly to a shield shunt cable 31. The shunt cable 31 is fastened in a mouth 33 of the contact pressure sleeve 24, which mouth 33 projects into the bore 32 of the closing screw 25. The measurement values are fed to an evaluating circuit and control device, not shown, of the internal combustion engine via the shunt cable 31.

The operation of a pressure transducer is generally known and therefore need not be described in more detail. The force acting on the sensor 18 via the diaphragm 14 and the plunger 16 generates a surface charge of the quartz crystals 19, 20 due to polarization. The voltage generated by the surface charge is tapped as a measurement signal via the intermediate electrode 21 and the shunt line 29.

The heat conducting foil 17 contributes to the fact that the temperature in the sensor block 18 amounts to a maximum of 150° C. in spite of high temperatures in the range of approximately 600° C. at the combustion chamber side—for a sufficient self-cleaning of the pressure transducer surface. The high thermal resistance of the plunger 16, which is caused by the low heat conduction of the utilized material (V4A) and the plunger geometry, contributes chiefly to this. The limit of 150° follows from the temperature dependency of the piezoelectric coefficient $d_{11}$, whose value drops off more steeply above 150° C. with the use of the α-quartz. The $d_{11}$ coefficient is based on the crystallographic properties of the α-quartz. It determines the magnitude of the electrical charge produced by the force in the assumed orientation of the normal line of the disks parallel to the crystallographic x-direction of the α-quartz, which is simultaneously the force direction.

The diaphragm 14 is produced with an annular etched-in recess. In order to obtain the well-defined effective surface $A_{eff}$ for a pressure/force conversion which is accordingly made possible, which effective surface $A_{eff}$ is as independent as possible from pressure, the weld of the outer thick rim of the diaphragm 14 which is fastened at the front side of the housing 10 and at the front side of the central area of the diaphragm 14 contacting the plunger 16, is advanced as closely as possible to the edge of the recess.

E.g., a Nimonic 90-foil with a thickness of 250 μm can be used as diaphragm 14, an annular recess with a width of 1 mm being etched into the latter. The diaphragm which is accordingly formed, has a thickness of 60 to 80 μm in bending area of the diaphragm 14. It has an optional small spring constant $c_M$. The diaphragm 14 can be welded in the less sensitive, thicker area without the spring constant $c_M$ being influenced. In order to obtain a minimum prestress for the quartz disks, the ends of the housing and plunger are ground so as to be flush in subsequent machining work prior to welding.

The diaphragm thickness was selected so as to be as small as possible based on the strength requirements (test pressure 300 bar). The spring constant of the diaphragm $c_M$ is accordingly small enough so that the effects of force on the quartz crystals proceeding from periodic changes in temperature are likewise as small as possible, the magnitude of the force effects increasing with the spring constant $c_M$ and with the third power of the diaphragm thickness. The dynamic temperature error is accordingly reduced to a minimum. The substitution of the mechanical by welding and gluing in the production of the force-locking connection of the diaphragm via plunger, quartz crystals, intermediate layers and abutment up to the housing, has the advantages which have already been mentioned.

Figure 2:
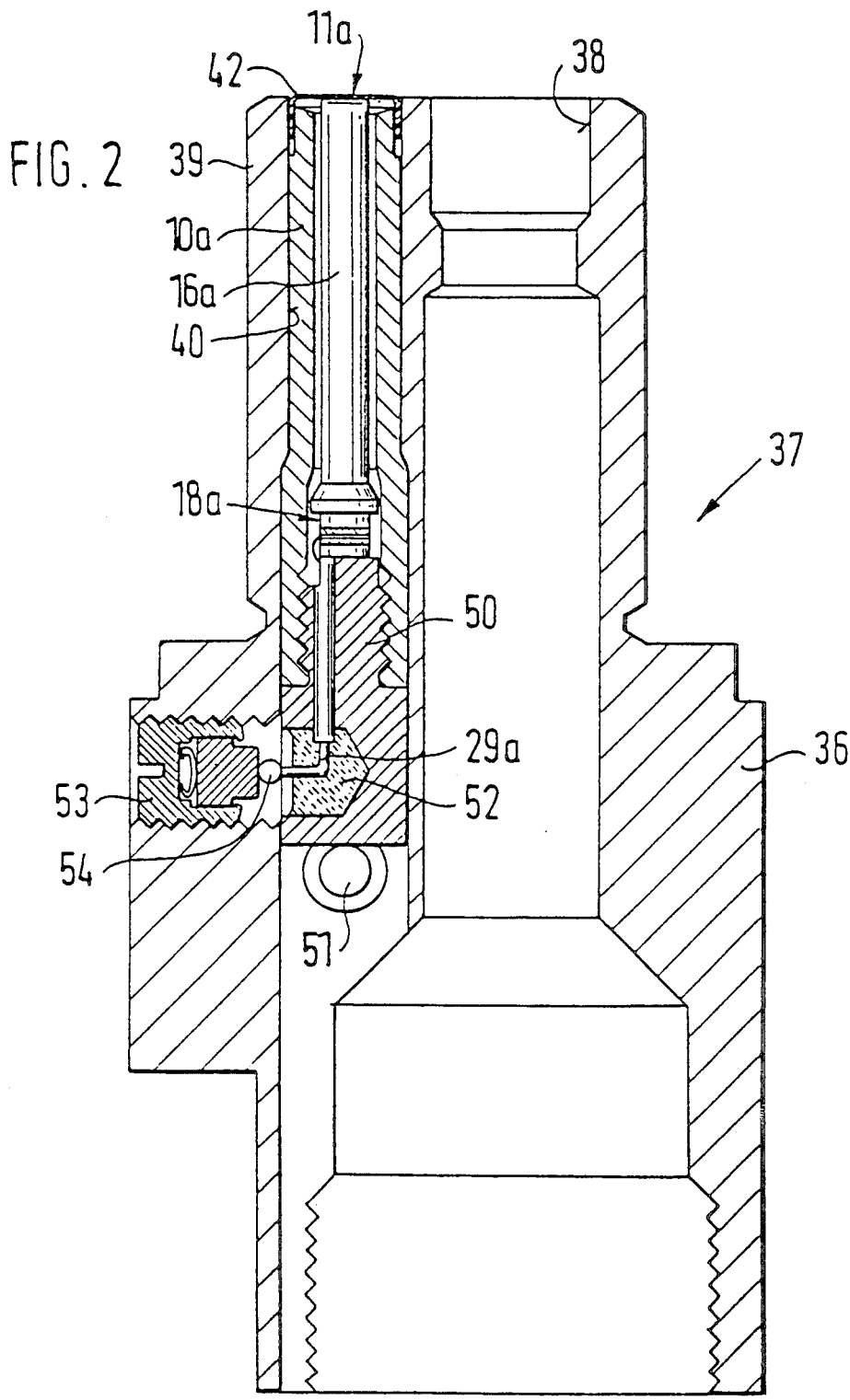
FIG. 2 shows a cross-sectional view of the housing of a spark plug with an installed pressure transducer according to the invention.
Figure 3:
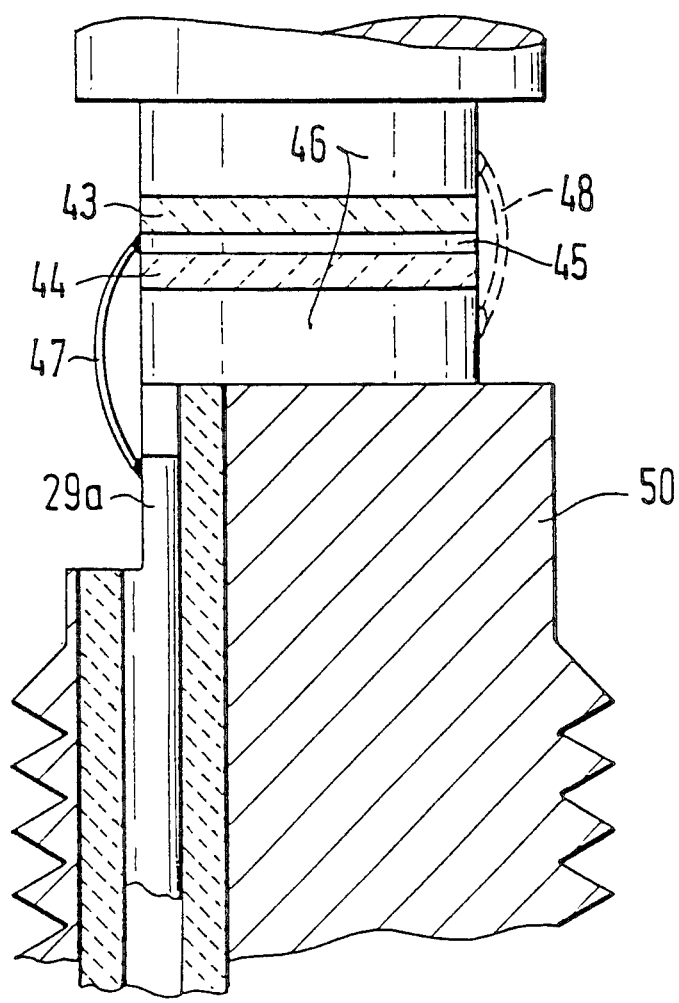
FIG. 3 shows a partial cross-sectional view of a pressure transducer shown in FIG. 1.

FIG. 2 shows a pressure transducer 11a which is installed in the housing 36 of a spark plug 37 and is produced as an independent unit. For this purpose, the bore 38 for the spark plug insulator of the spark plug 37 is constructed so as to be off-center. The pressure transducer 11a is arranged in a bore 40 formed in the thicker part 39 which is accordingly formed. In contrast to the embodiment according to FIG. 1, the pressure transducer 11a comprises a diaphragm, shown in more detail in FIG. 4, which is constructed as a cap diaphragm 42. In contrast to the plunger in FIG. 1, the plunger 16a has a greater length and a smaller diameter. Its thermal resistance is accordingly increased to the extent that a heat conducting foil can be dispensed with in connection with the thinner quartz disks 43, 44. The sensor block 18a is connected with the contacting plunger 16a and the closing screw 50 with conducting glue. As can be seen in more detail from FIG. 3, the sensor block 18a comprises two quartz disks 43, 44, whose x-axes have opposite directions, i.e. opposite polarization. A middle electrode 45 is located between the quartz disks 43, 44 and a cover disk 46 is located in each instance above and below the quartz disks 43, 44. The individual disks 43 to 46 are glued together with a conducting glue. The gluing is carried out already with larger disks. After curing, the glued disk set is sawed into the small sensor blocks, which are square in this instance, e.g. (1.8 × 1.8 mm2). Accordingly, sufficient space is provided for inserting the bonds for contacting the electrodes in semiconductor technology, so that the space requirement for contacting does not exceed the lower plunger diameter. Iron, or another material having bonding characteristics, can be used as work material for the cover disks 46. The middle electrode is connected with the shunt line 29a by a bond wire 47 and the two cover disks 46 are connected by a second bond wire 48.

The shunt line 29a is fixed in a side bore 52 of the closing screw 50, which side bore 52 is filled with insulating synthetic resin. The connection with the connection cable, which is mounted in another plane of the spark plug housing 36, not shown, so as to be fixed and exchangeable, is produced e.g. with a contact screw 53 which presses the connecting wire 54 against the end of the shunt line 29a. The closing screw 50, and accordingly the housing 10a of the pressure transducer 11a, is pressed against the wall of the bore hole 40 by a screw 51, which is inserted from the side and is conical in the front, and fixed in the housing 36 of the spark plug 37. The fit of the housing 10a with the bore hole 40 should be as free of play as possible. In order to have a defined heat transfer to the housing 36 of the spark plug 37, the area of the seat occurring as a result of the screw 51 should be coated with silicon grease prior to insertion of the pressure transducer 11a.

Figure 4:
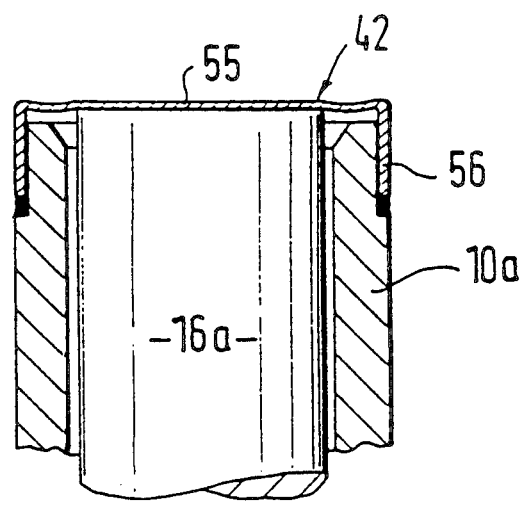
FIG. 4 shows a cap diaphragm.

The cap diaphragm 42 is shown in more detail in FIG. 4. It is constructed in a pot-shaped manner and has a base 55 with a thickness of approximately 80 μm serving as diaphragm and a thicker, e.g. 200 μm thick, cylindrical rim 56. The thickness of the base 55, i.e. the diaphragm, can accordingly be very thin in a simple manner, while a thicker rim 56 is possible for fastening. Only the rim 56 is welded on at the housing 10a. With the same effective surface A$_{eff}$, the diameter at the end of the housing 10a facing the combustion chamber can be reduced compared to the construction according to FIG. 1. Further, the cap diaphragm 42 is automatically centered. The plunger 16a is welded on at the base 55 of the cap diaphragm 42. So-called laser welding is particularly suitable for this purpose. The cap diaphragm 42 has a uniform pressure sensitivity along the entire pressure region and has low measurement errors during changes in temperature.

While the invention has been illustrated and described as embodied in a pressure transducer for determining pressure in the combustion chamber of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In a pressure sensor (11) for detecting pressure in a combustion space of an internal combustion engine, said pressure sensor comprising a housing (10), a plunger (16) arranged in the housing (10), an abutment (23) also arranged in the housing (10), and at least one piezoelectrically acting crystal (19,20) located in the housing (10) between the plunger (16) and the abutment (23) and a diaphragm (14) having a bending region connected to the housing (10), the improvement wherein the bending region of the diaphragm (14) has a thickness of 60 to 100 micrometers, and wherein said plunger (14), said abutment (23) and said at least one piezoelectrically acting crystal (19,20) are connected with each other in said housing (10) so that force transmission to the at least one piezoelectrically acting crystal (19,20) occurs without mechanical pretensioning, and further comprising a weld connection between said diaphragm (14) and said housing (10) formed by welding and glue connections between the abutment (23) and the at least one piezoelectrically acting crystal (19,20) and between the plunger (16) and the at least one piezoelectrically acting crystal (19,20) formed by gluing.

2. The improvement according to claim 1, further comprising another weld connection, said other weld connection being made between the diaphragm (14) and the plunger (16) by welding.

3. The improvement according to claim 1, wherein the glue connection is made with a current-conducting glue.

4. The improvement according to claim 1, wherein the weld connection is made by laser welding.

5. The improvement according to claim 1, wherein the diaphragm comprises a cap diaphragm (42).

6. The improvement according to claim 5, wherein the cap diaphragm (42) has a rim (56) and a base (55), said base acting as the bending region, and a thickness of said bending region is smaller than a thickness of the rim (56).

7. The improvement according to claim 1, further comprising a heat-conducting foil (17) arranged between the at least one piezoelectrically acting crystal (19,20) and the plunger (16).

8. In a pressure sensor (11) for detecting pressure in a combustion space of an internal combustion engine, said pressure sensor comprising a housing (10), a plunger (16) arranged in the housing (10), an abutment (23) also arranged in the housing (10), and at least one piezoelectrically acting crystal (19,20) located in the housing (10) between the plunger (16) and the abutment (23) and a diaphragm (14) having a bending region connected to the housing (10), the improvement wherein the bending region of the diaphragm (14) has a thickness of 60 to 100 micrometers, and wherein said plunger (14), said abutment (23) and said at least piezoelectrically acting crystal (19,20) are connected in said housing (10) so that force transmission to the at least one piezoelectrically acting crystal (19,20) occurs without mechanical pretensioning and with material connection, and further comprising a weld connection between said diaphragm (14) and said housing (10) formed by welding and glue connections between the abutment (23) and the at least one piezoelectrically acting crystal (19,20) and between the plunger (16) and the at least one piezoelectrically acting crystal (19,20) formed by gluing and further comprising a square sensor block (18) consisting of an iron layer acting as a central electrode (45) arranged between two of said piezoelectrically acting crystals (43,44) and two outer iron layers (46), each of said outer iron layers (46) being located on a side of each of the crystals (43,44) opposite from the central electrode (45), and further comprising a discharge wire (29) connected to the central electrode (45) by a first bonding wire (47), and a second bonding wire (48) connecting the outer iron layers (46).

* * * * *